United States Patent
Inoue (10) Patent No.: US 10,978,756 B2
(45) Date of Patent: Apr. 13, 2021

(54) BATTERY PACK

(71) Applicant: DENSO CORPORATION, Kariya (JP)

(72) Inventor: Yoshimitsu Inoue, Chiryu (JP)

(73) Assignee: DENSO CORPORATION, Kariya (JP)

(*) Notice: Subject to any disclaimer, the term of this patent is extended or adjusted under 35 U.S.C. 154(b) by 726 days.

(21) Appl. No.: 14/718,440

(22) Filed: May 21, 2015

(65) Prior Publication Data

US 2015/0340745 A1 Nov. 26, 2015

(30) Foreign Application Priority Data

May 23, 2014 (JP) .............................. JP2014-107466

(51) Int. Cl.
| | | |
|---|---|---|
| *H01M 10/6563* | (2014.01) | |
| *H01M 10/6565* | (2014.01) | |
| *H01M 10/613* | (2014.01) | |
| *H01M 10/625* | (2014.01) | |

(52) U.S. Cl.
CPC ..... *H01M 10/6563* (2015.04); *H01M 10/613* (2015.04); *H01M 10/625* (2015.04); *H01M 10/6565* (2015.04)

(58) Field of Classification Search
None
See application file for complete search history.

(56) References Cited

U.S. PATENT DOCUMENTS

| | | |
|---|---|---|
| 2006/0036883 A1 | 2/2006 | Hashizumi et al. |
| 2008/0296075 A1* | 12/2008 | Zhu .......................... B60K 1/04 180/68.1 |
| 2014/0295224 A1 | 10/2014 | Inoue |
| 2014/0356660 A1 | 12/2014 | Inoue |

FOREIGN PATENT DOCUMENTS

| | | | |
|---|---|---|---|
| JP | 2002-313441 | | 10/2002 |
| JP | 2002313441 A | * | 10/2002 |
| JP | 2008-054379 | | 3/2008 |
| JP | 2011-134615 | | 7/2011 |
| JP | 2011-173447 | | 9/2011 |
| JP | 2012-109126 | | 6/2012 |
| JP | 2013-122844 | | 6/2013 |
| JP | 2013-152821 | | 8/2013 |
| JP | 2013152821 A | * | 8/2013 .......... H01M 10/625 |

(Continued)

OTHER PUBLICATIONS

Co-pending U.S. Appl. No. 14/242,100, filed Apr. 1, 2014 (35 pgs.).

*Primary Examiner* — Zhongqing Wei
(74) *Attorney, Agent, or Firm* — Nixon & Vanderhye P.C.

(57) ABSTRACT

A battery pack includes battery cells, a fan unit that blows air for cooling the battery cells, a case housing therein the battery cells and the fan unit, a circulation passage in which the air blown out from the fan unit flows before being sucked into the fan unit and after exchanging heat with the battery cells, a heat exchanging part that is disposed downstream of battery passages through which the air circulating in the circulation passage as an circulating air flows to exchange heat with the battery cells and below bottom ends of the batteries, and a drain passage that leads to outside of the case for drainage, the drain passage including a drain opening formed in the case so as to be located below the heat exchanging part.

16 Claims, 3 Drawing Sheets

(56) References Cited

FOREIGN PATENT DOCUMENTS

| JP | 2014-080189 | | | 5/2014 |
|---|---|---|---|---|
| JP | 2014080189 | A | * | 5/2014 |
| JP | 2014-235899 | | | 12/2014 |
| JP | 2015-170418 | | | 9/2015 |
| JP | 2015-204231 | | | 11/2015 |

* cited by examiner

BATTERY PACK

This application claims priority to Japanese Patent Application No. 2014-107466 filed on May 23, 2014, the entire contents of which are hereby incorporated by reference.

BACKGROUND OF THE INVENTION

1. Field of the Invention

The present invention relates to a battery pack housing batteries in its case.

2. Description of Related Art

The battery pack described in Japanese Patent Application Laid-open No. 2011-134615 (patent document 1) includes batteries, a fan unit and a cooling unit having an evaporator which are housed in its case. The air cooled in the evaporator is distributed from a main air passage to sub-air passages by the fan unit to be supplied to the batteries to absorb heat from the batteries, and collected to the evaporator to be cooled again.

The battery pack described in Japanese Patent Application Laid-open No. 2012-109126 (patent document 2) is configured to maintain its battery cooling performance by discharging the air having absorbed heat from batteries housed in its case to the outside to be exchanged with fresh air supplied from outside the case.

However, the battery pack described in patent document 1 has a problem in that since the batteries are cooled using a fluid circulating within the case, if the ambient temperature is high, the batteries cannot be cooled sufficiently.

In addition, the battery pack described in patent document 1 has the structure in which a seal member is interposed between the battery tray constituting the bottom part of the case and the battery cover constituting the top part of the case for preventing water from entering the case. However, since the evaporator and the batteries are located at the same height, the condensed water generated in the evaporator is likely to flow toward the batteries, and if it accumulates to a certain level, the batteries may be flooded. The seal member can prevent such a situation in the beginning, however, since the seal member deteriorates with time, there is a concern that the batteries may be flooded after long-term use.

The battery pack described in patent document 2 has a problem in that when both the air supply passage and the air discharge passage are always open to the outside, the operation noise of the fan unit easily leaks to the outside. In addition, water and dust can easily enter the case through the air supply passage and the air discharge passage.

SUMMARY

An exemplary embodiment provides a battery pack including:
battery cells;
a fan unit that blows air for cooling the battery cells;
a case housing therein the battery cells and the fan unit;
a circulation passage in which the air blown out from the fan unit flows before being sucked into the fan unit and after exchanging heat with the battery cells;
a heat exchanging part that is disposed downstream of battery passages through which the air circulating in the circulation passage as circulating air flows to exchange heat with the battery cells and below bottom ends of the battery cells; and
a drain passage that leads to outside of the case, the drain passage including a drain opening formed in the case so as to be located below the heat exchanging part.

According to the exemplary embodiment, there is provided a battery pack capable of preventing condensed water generated by its heat exchanging part from contacting battery cells, suppressing its operation noise from leaking to the outside and suppressing water from entering its case from the outside.

Other advantages and features of the invention will become apparent from the following description including the drawings and claims.

PREFERRED EMBODIMENTS OF THE INVENTION

In the below described embodiments, the same or equivalent parts or members are indicated by the same reference numerals. In the below described embodiments, when only part of the entire structure is explained, descriptions of the preceding embodiments can be referred to for the other parts. Two or more of the embodiments may be combined partially when there is no apparent disadvantage in the combination.

First Embodiment

Figure 1:
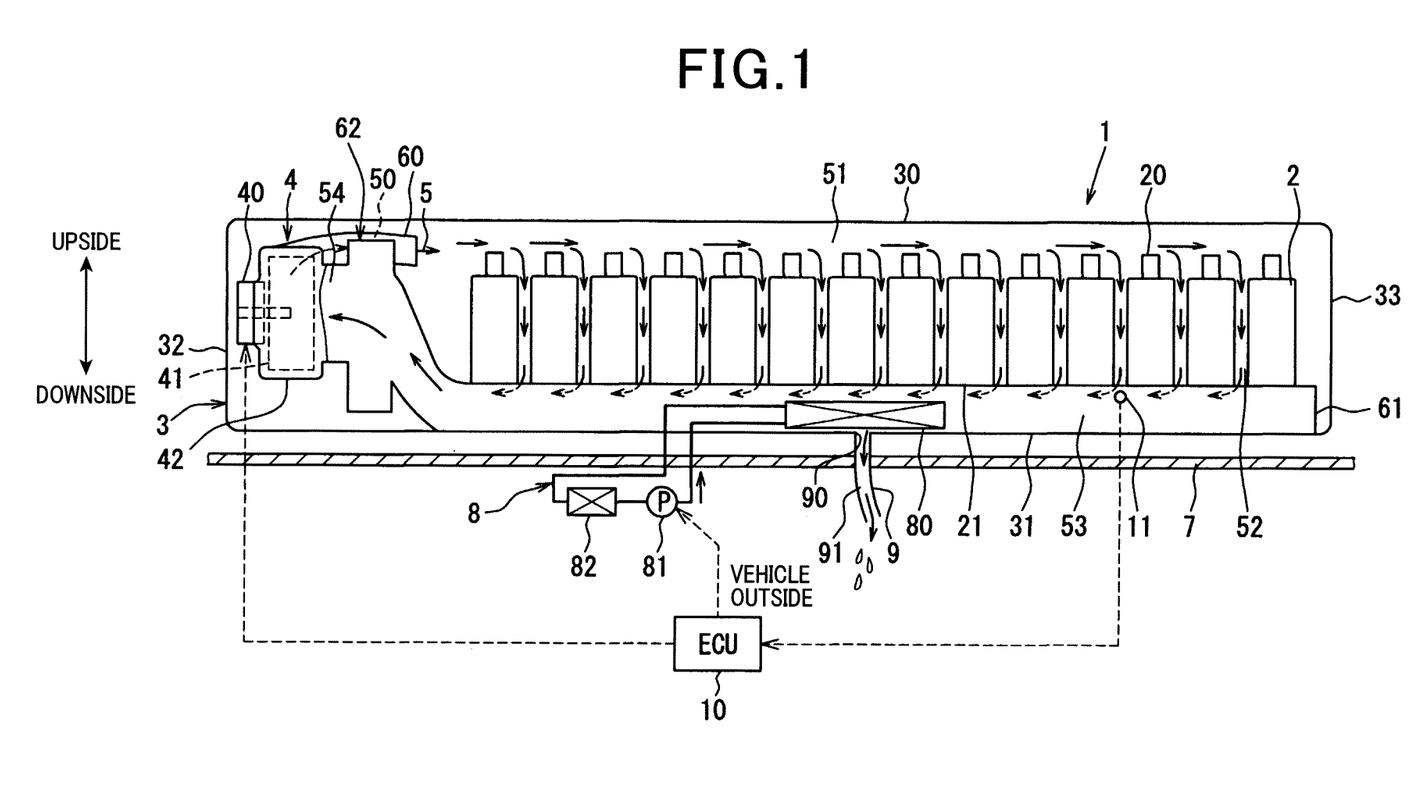
FIG. 1 is a diagram schematically showing the structure of a battery pack according to a first embodiment of the invention and explaining an air flow within a pack case of the battery pack.

FIG. 1 is a diagram schematically showing a structure of a battery pack 1 according to a first embodiment of the invention and flow of the air in a pack case 3 of the battery pack 1. The battery pack 1 is used for a hybrid vehicle whose driving source is constituted of a combination of an internal combustion engine and an electric motor driven by electric power stored in a battery, an electric vehicle whose driving source is constituted of an electric motor and so forth. The battery pack 1 houses therein battery cells 2 such as nickel hydrogen rechargeable batteries, rechargeable lithium-ion batteries or organic radical batteries.

The battery pack 1 includes a battery assembly constituted of the battery cells 2, the pack case 3 which forms an inner space therein, and a fan 4 unit for circulating the air within the pack case 3. The pack case 3 houses therein the battery cells 2 and the fan unit 4.

Each of the battery cells 2 includes a positive terminal and a negative terminal as electrode terminals 20 projecting outside from its outer case. The positive and negative terminals of each adjacent battery cells 2 are electrically connected through conductive members such as bus bars.

The electrode terminals are connected to the bus bars by screw-fitting, welding or the like. A general terminal is disposed on both ends of the assembly of the battery cells 2 which are electrically connected to one another through the bus bars or the like. The battery pack 1 is charged and discharged through the general terminals.

The battery pack 1 includes a battery management unit. The battery management unit is for performing control on the battery cells 2 including management of charge level of the battery cells 2. In this embodiment, the battery management unit is configured to monitor the current, voltage and temperature of the battery cells 2, and detect an abnormality, a short circuit and so on of the battery cells 2.

The battery management unit receives a signal indicating the current value measured by a current sensor. The battery management unit is implemented as an ECU including an input circuit, a microcomputer and an output circuit. The microcomputer includes a storage device for storing battery data. The battery data stored in the storage device includes data indicating the battery voltage, charge current, discharge current and temperature of the battery pack 1. The battery management unit is capable of communicating with various electronic control units mounted on the vehicle.

The pack case 3 is formed therein a circulation passage 5 through which a fluid is forcibly circulated by the fan unit 4. The circulation passage 5 is a passage formed within the pack case 3 to enable a fluid to pass therethrough. The circulation passage 5 serves as a main stream channel by way of which the air blown out from the fan unit 4 is sucked into the fan unit 4 after exchanging heat with the battery cells 2. A fluid within the pack case 3 flows out from the fan 4 unit at one place, and flows into the fan 4 unit at one place. Accordingly, the fluid within the pack case 3 circulates in the circulation passage 5 always by way of the fan unit 4.

As shown in FIG. 1, the circulation passage 5 includes a series of at least a suction part 54 as a suction passage, a blow-off passage 50, a top wall side passage 51, battery passages 52 and a collection passage 53. The blow-off passage 50 serves as a fluid discharge passage through which a fluid discharged from the fan unit 4 passes. The suction part 54 and the collection passage 53 constitute a passage through which the air discharged from the blow-off passage 50 flows after exchanging heat with the battery cells 2.

The pack case 3, which is formed in a box shape having walls surrounding the inner space thereof, is molded of an aluminum plate or a steel plate. In this embodiment, the pack case 3 includes six walls (four side walls including side walls 32 and 33, a top wall 30 and a bottom wall 31). There are two pairs of the side walls (one pair being the side wall 32 and 33) opposite to each other. The top wall 30 and the bottom wall 31 are opposite to each other, and perpendicular to the two pairs of the side walls.

The pack case 3 can be manufactured by joining and assembling a plurality of case bodies to one another so as to form therein a box shape space. At least one of the walls of the pack case 3 may be formed with projections or depressions to increase its heat dissipation area.

The battery cells 2 form cell stack bodies within the inner space of the pack case 3. The battery cells 2 of each cell stack body are arranged at even intervals. Between each adjacent battery cells 2, the battery passage 52 is formed through which a fluid can pass. The battery passage 52 is formed of a spacer member disposed between the adjacent cells. The spacer member is held and supported between the cells, such that a passage through which fluid flows is formed between the adjacent cells. That is, each battery passage 52 is closed at the side of the side walls, opens to the top wall side passage 51 at the side of the top wall 31, connected to a collection duct 61 at the side of the bottom wall 30 to communicate with the collection passage 53. Accordingly, each battery passage 52 includes a fluid inlet at the side of the top wall 30, and includes a fluid outlet collected to the collection passage 53 at the side of the bottom wall 31.

The collection duct 61 is a duct which joins a duct connection member 62 connected to the suction part 54 to the bottom ends 21 of the battery cells 2. The collection duct 61 constitutes the collection passage 53 which enables the air flowing out from the battery passages 52 to thermally connect to the bottom wall 31. Accordingly, the heat of the air flowing through the collection passage 53 can be transmitted to the bottom wall 31.

The collection passage 53 is a passage which extends passing the outlets of the battery passages 52 toward the duct connection member 62 in parallel with the bottom wall 31, and communicates with the suction part 54 of the fan unit 4 through the duct connection member 62. The top wall side passage 51 is a passage which extends in parallel with the top wall 30 between the battery cells 2 and the top wall 30.

The fan unit 4, which is for circulating a fluid in the pack case 3 in the circulation passage 5, includes a motor 40, a sirocco fan 41 driven by the motor 40 and a fan casing 42 housing therein the sirocco fan 41. The fan casing 42 is formed with the suction part 54 leading to a suction opening of the sirocco fan 41. The suction part 54 and the collection passage 53 are connected to each other by the duct connection member 62 to communicate with each other. The duct connection member 62 is an attachment which joins a duct leading to the collection duct 61 to the fan casing 42. The duct connection member 62 includes a rectangular chamber thereinside. Accordingly, the duct connection member 62 contributes to reduce the flow resistance of a circulating fluid.

The fan unit 4 is disposed such that the rotation axis of the fan 41 is along the top wall 30 and the bottom wall 31 so as to suck a fluid along the rotation axis and blow out the fluid in the centrifugal direction. In this embodiment, the fan unit 4 is disposed with the side of the motor 40, that is, its back side opposite to the suction part 54 facing the side wall 32 of the pack case 3.

The blowoff part of the fan casing 42 is connected with a blow-off duct 60 which constitutes the blow-off passage 50 that is a part of the circulation passage 5. The blow-off passage 50 of the fan unit 4 extends along the top wall 30 in the centrifugal direction of the fan 41. Accordingly, the air blown out from the blow-off passage 50 by the fan unit 40 flows through the top wall side passage 51 along the top wall 30, and then flows toward the battery passages 52 from the top wall side passage 51. Thereafter, the air flows downward to enter the battery passages 52 by being sucked by the fan unit 4, flows into the collection passage 53 from the bottom ends of the battery passages 52, and returns to the fan unit 4 by way of the suction part 54.

The air flowing in the circulation passage 5 absorbs the heat of the battery cells 2 or heats the battery cells 2 while flowing through the battery passages 52. The air that has cooled or heated the battery cells 2 is collected to the collection passage 53, and sucked into the fan unit 4 through the suction part 54. Since the air circulating within the pack case 3 contacts the positive and negative terminals of the battery cells 2 and the bus bars connecting these terminals, these terminals and the bus bars constitute a heat transfer means.

The battery pack 1 includes a heat exchanger 80 as a heat exchanging part for cooling the circulating air by heat exchange. The heat exchanger 80 is disposed downstream of the battery passages 52 through which the circulating air circulating in the circulation passage 5 flows to exchange heat with the battery cells 2, and below the bottom ends 21 of the battery cells 2. The heat exchanger 80 includes tubes through which a coolant flows, and heat radiating fins disposed so as to be able to exchange heat with these tubes. In the heat exchanger 80, the coolant flowing through the tubes and the circulating air passing around the fins exchange heat with each other through the tubes and the fins, so that the circulating air having absorbed heat from the battery cells 2 are cooled in the collection passage 53.

The passages within the respective tubes of the heat exchanger 80 are in communication with an annular passage formed of an annular pipe constituting a cooling circuit 8. The annular passage is connected to the inlet of the heat exchanger 80 to be branched into the passages of the respective tubes of the heat exchanger 80, which are collectively connected to the outlet of the heat exchanger 80. The cooling circuit 8 includes a pump 81 for forcibly circulating the coolant, and a heat exchanger 82 for dissipating heat of the coolant having absorbed heat in the heat exchanger 80.

Like the heat exchanger 80, the heat exchanger 82 includes tubes and fins. In the heat exchanger 82, the coolant circulating through the cooling circuit 8 and the circulating air passing around the fins exchange heat with each other through the tubes and the fins, so that the heat of the coolant is dissipated to the atmosphere. Two pipes are provided so as to extend from the inlet and outlet of the heat exchanger 80, respectively, and penetrate through the bottom wall 31 and the floor 7 of the vehicle. The pump 81, the heat exchanger 82 and portions of these pipes connected to the pump 81 are located outside the vehicle. As the coolant, a cooling fluid such as water, antifreeze solution, $CO_2$ and fluorocarbon can be used.

The battery pack 1 includes a drain passage 91 which leads to the outside of the pack case 3 for drainage. The drain passage 91 includes a drain opening 90 formed in the bottom wall 31 of the pack case 3 so as to be located below the heat exchanger 80. The drain opening 90 penetrates through the bottom wall 31 to make communication between the inside of the pack case 3 and the drain passage 91. The drain passage 91 is a passage formed inside a drain duct 9 connected to the drain opening 90.

It is preferable that the drain opening 90 is provided in the bottom wall 31 so as to be located immediately below the heat exchanger 80 which is disposed below the battery cells 2. The drain passage 91 is smaller in cross-sectional area than the collection passage 53. The drain passage 91 is connected to the collection passage 53 formed inside the collection duct 61. The drain duct 9 is formed of a pipe for draining the condensed water flowing down to the collection passage 53 or the bottom wall 31 to the outside of the vehicle. The drain duct 9 extends downward from the bottom wall 31, penetrates through the floor 7 of the vehicle. The opening end on the downstream side of the drain duct 9 is located outside the vehicle. According to this configuration, the condensed water generated in the heat exchanger 80 drops down, accumulates in the collection passage 53, and is discharged to the outside of the vehicle from the drain opening 90 through the drain passage 91.

The pack case 3 may be installed so as to be in direct contact with the floor 7 of the vehicle. Since the floor 7 of the vehicle is frequently cooled by the air-conditioned air, and is hardly exposed to the direct sun light, its temperature is relatively low. Accordingly, when the pack case 3 is in direct contact with the floor 7 of the vehicle, the battery pack 1 can provide a heat dissipation effect through its walls. Also, the pack case 3 may be installed on the floor 7 through a bracket member with the bottom wall 31 being suspended from the floor 7.

The battery cells 2 generate heat when being charged or discharged. In this embodiment, the battery management unit always monitors the temperature of the battery cells 2 within the battery pack 1, and controls the operation of the fan unit 4 in accordance with the temperature of the battery cells 2. The fan unit 4 can operate on the power stored in the battery cells 2. The operation of the fan unit 4 is controlled by a control unit 10. The control unit 10 may be implemented by the battery management unit. The control unit 10 controls the output power of the fan unit 4 in accordance with the temperature measured by a temperature sensor 11 to thereby control the flow rate of the circulating air.

The temperature sensor 11 is disposed to measure the temperature of the circulating air just flown out from the battery passages 52. In this embodiment, the temperature sensor 11 is disposed at a position before the position where the heat exchange between the circulating air and the heat exchanger 80 is performed, that is, upstream of the heat exchanger 80. Since the temperature measured by the temperature sensor 11 has a correlation with the temperature of the battery cells 2, the temperature sensor 11 can be used as a sensor for measuring the temperature of the battery cells 2.

The control unit 10 controls the rotational speed of the fan 41 of the fan unit 4 and the operation of the pump 81 by executing an operation program stored in its computing section or its storage section. The control unit controls the duty ratio in a range from 0 to 100% of a voltage applied to the motor 40 to control the rotational speed of the fan 41. By this duty control, the air flow rate of the fan unit 4 can be adjusted stepwise or non-stepwise. The control unit 10 controls the rotational speed of the fan 41 to a first speed when the temperature measured by the temperature sensor 11 exceeds a first reference temperature.

The control unit 10 causes the pump 81 to operate to circulate the coolant through the cooling circuit 8 when the temperature measured by the temperature sensor 11 exceeds a second reference temperature which is higher than the first reference temperature. As a result, since the heat exchange between the air circulating through the collection passage 53 and the coolant is promoted, the heat absorption performance of the heat exchanger 80 is increased. The circulating air whose temperature has lowered can cool the battery cells 2 as a fluid having a high heat absorbing capacity. The control unit 10 may be configured to control the rotational speed of the fan 41 to a second speed higher than the first speed when it is necessary to further increase the battery cooling performance.

The drain passage 91 serves as a fail-safe passage for discharging a gas within the pack case 3 to the outside of the vehicle if the internal pressure of the pack case 3 increases greatly due to the gas discharged from the battery cells 2.

The battery pack 1 is installed in a pack housing space provided in the trunk area of the vehicle or in the trunk/back area located below the trunk area. A spare tire and tools can be housed also in the pack housing space. The battery pack 1 is installed in the pack housing space with its bottom wall 31 or collection passage 53 facing downward.

The pack case 3 may be installed in the vehicle so as to be in contact with the floor 7 of the vehicle so that the heat within the pack case 3 can be transmitted to the floor 7 through its walls. In this case, the heat within the pack case 3 is transmitted from the air having exchanged heat with the battery cells 2 to the floor 7 of the vehicle through the bottom wall 31. A heat dissipation sheet may be interposed between the bottom wall 31 and the floor 7 of the vehicle so that the heat within the pack case 3 can be transmitted to the floor 7 from the bottom wall 31 through the heat dissipation sheet.

The air circulating in the circulation passage 5 contacts the side walls, the top wall 30 and the bottom wall 31. The circulating air dissipates heat to the outside of the pack case 3 through the side walls and the top wall 30 before exchanging heat with the battery cells 2. Also, the circulating air dissipates heat to the outside of the pack case 3 through the top wall 30 while flowing through the top wall side passage 51 immediately before exchanging heat with the battery cells 2. Accordingly, the whole of the top wall 30 and the whole of the side walls perpendicular to the top wall 30 serve as a heat dissipation surface for dissipating the heat of the battery cells 2 housed in the pack case 3.

Next, advantages of the battery pack 1 according to the first embodiment of the invention are explained. The battery pack 1 includes the heat exchanger 80 at the position which is downstream of the battery passages 52 through which the circulating air flows to exchange heat with the battery cells 2, and below the bottom ends of the battery cells 2. The battery pack 1 is provided with the drain passage 91 for drainage to the outside of the pack case 3, the drain passage 91 including the drain opening 90 formed in the pack case 3 so as to be located below the heat exchanger 80.

The battery pack 1 is capable of uniformly cooling the battery cells 2 and suppressing noise leakage and dust entering, because the battery cells 2 are cooled by the circulating air circulating in the circulation passage 5 and the heat exchanger 80 located below and downstream of the battery cells 2. Further, since the battery pack 1 is provided with the drain passage 90 with the drain opening 91 located below the bottom ends 21 of the battery cells 21, the condensed water accumulated in the vicinity of the drain opening 90 below the bottom ends 21 of the battery cells 2 is gradually discharged through the drain passage 91. Accordingly, even when the stagnating condensed water is moved due to the wind pressure of the circulating air, it is possible to prevent the high-voltage portions of the battery cells 2 from being in contact with water. Therefore, the battery cells 2 can be prevented from degrading in performance and becoming short-lived. As explained above, the battery pack 1 according to the first embodiment is capable of both preventing the condensed water from contacting the battery cells 2 and ensuring the battery cooling performance.

The drain opening 90 is located immediately or nearly immediately below the heat exchanger 80. Accordingly, the condensed water generated by the heat exchanger 80 flows downward by gravity immediately or nearly immediately below the heat exchanger 80. Even when the condensed water is moved due to the wind pressure of the circulating air flowing through the collection passage 53, it is possible for the condensed water to flow into the drain passage 91 quickly from the drain opening 90 located immediately or nearly immediately below the heat exchanger 80. In addition, since the condensed water is hard to be blown off by the air flowing through the collection passage 53, the condensed water dropped from the heat exchanger 80 can be discharged smoothly to the outside of the pack case 3.

The electrode terminals 20 of each battery cell 2 project upward from the top surface of its outer case opposite to the bottom end of its outer case, which is located near the heat exchanger 80. Accordingly, since the condensed water generated in the heat exchanger 80 flows downward by gravity and is discharged quickly from the drain opening 90, it is possible to cause the condensed water to move away from the high-voltage portions of the electrode terminals 20. Further, even if the condensed water is blown off by the circulating air, since the heat exchanger 80 is located below the bottom ends of the battery cells 2, the airborne water hardly reaches the electrode terminals 20. Therefore, the high voltage portions of the battery cells 20 can be prevented from being damaged by the condensed water.

Second Embodiment

Figure 2:
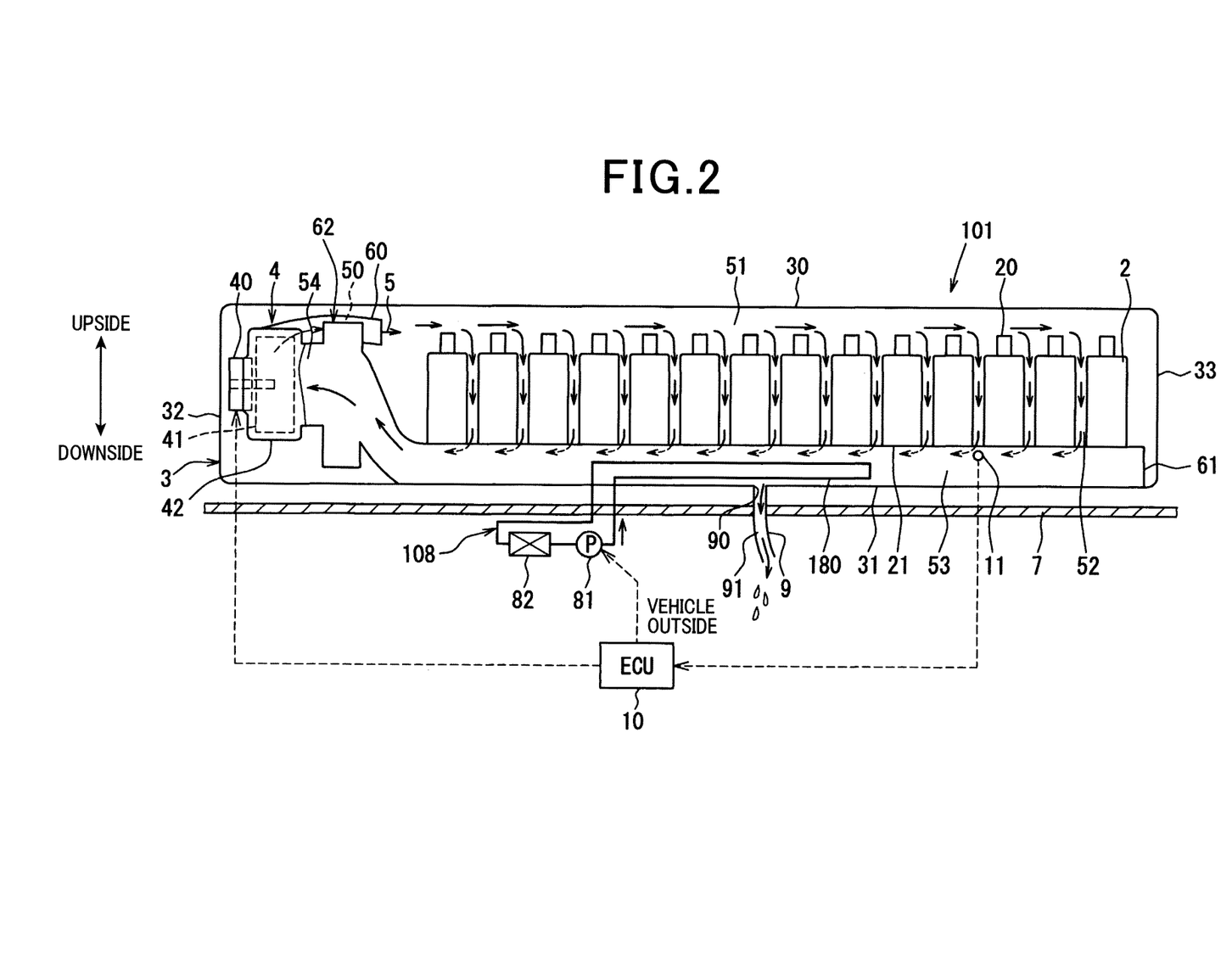
FIG. 2 is a diagram schematically showing the structure of a battery pack according to a second embodiment of the invention and explaining an air flow within a pack case of the battery pack.

Next, a second embodiment of the invention is described with a focus on differences with the first embodiment with reference to FIG. 2.

As shown in FIG. 2, in a battery pack 101 according to the second embodiment, the heat exchanging part is not a heat exchanger including tubes and fins, but is constituted of heat exchanging pipes 180. Each heat exchanging pipe 180 includes therein a coolant passage. The coolant passages of the respective heat exchanging pipes 180 communicate with an annular passage formed of an annular pipe as a cooling circuit 108. The heat exchanging pipes 180 may be pipes which branch from the annular pipe which forms the cooling circuit 108.

The heat exchanging pipes 180 constitute a heat exchanging part which is disposed downstream of the battery passages 52 through which the circulating air circulating in the circulation passage 5 passes to exchange heat with the battery cells 2, and below the bottom ends 21 of the battery cells 2. The coolant flowing through the heat exchanging pipes 180 exchanges heat with the circulating air passing around theses pipes so that the circulating air having absorbed heat from the battery cells 2 is cooled in the collection passage 53.

Third Embodiment

Figure 3:
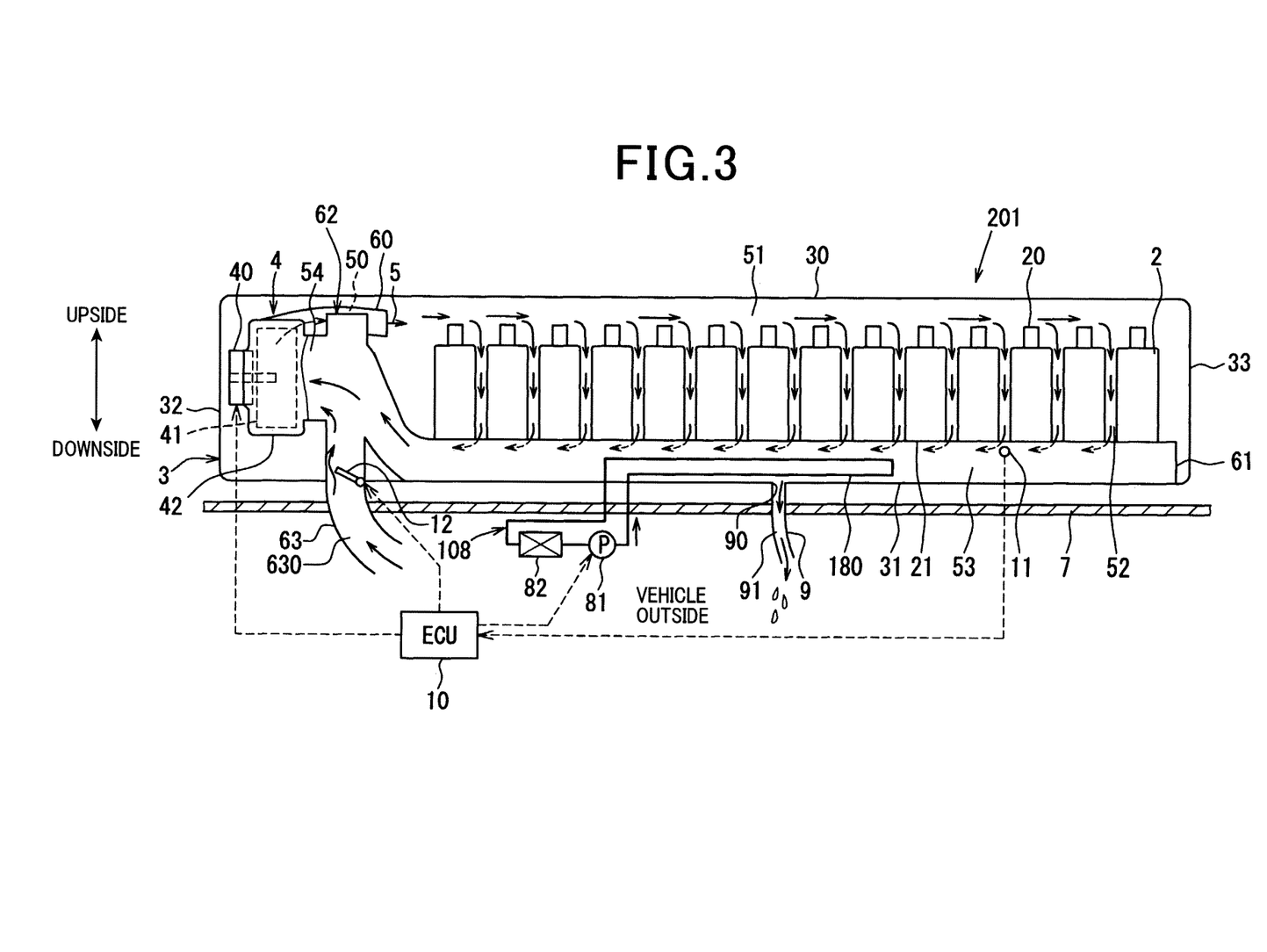
FIG. 3 is a diagram schematically showing the structure of a battery pack according to a third embodiment of the invention and explaining an air flow within a pack case of the battery pack.

Next, a battery pack 201 according to the third embodiment of the invention is described with a focus on differences with the first embodiment with reference to FIG. 3.

As shown in FIG. 3, the battery pack 201 includes an air introduction passage 630 for introducing the external air sucked by the fan unit 4 into the pack case 3, and an opening/closing device 12 for opening and closing the air introduction passage 630. Accordingly, the air sucked into the fan unit 3 is air that has passed through either the collection passage 53 or the air introduction passage 630.

The air introduction passage 630 makes communication between the fan unit 4 and the outside of the pack case 3. The air introduction passage 630 is smaller in cross-sectional area than the collection passage 53. The air introduction passage 630 is a passage formed inside an air supply duct 63 connected to the duct connection member 62. The air introduction passage 630 is disposed downstream of the battery passages 52, and connected to a specific portion located at a specific position upstream of the suction part 54 of the fan unit 4. The specific portion can be set at any position in an area including the collection passage 53 and the suction part 54.

The air supply duct 63 includes an air inlet opening which opens to the outside of the pack case 3. The air supply duct 63 penetrates through the bottom wall 31 of the pack case 3, and makes communication between the lower part of the duct connection member 62 and the outside of the pack case 3. When the air introduction passage 630 is open, the external air sucked into the air supply duct 63 by the fan unit 4 is introduced into the suction part 54 of the fan unit 4 through the air introduction passage 630 This air is blown out from the blow-off passage 50 and taken in the pack case 3 after flowing in the circulation passage 5.

The opening/closing device 12 opens and closes the air introduction passage 630 in accordance with the measured temperature.

The opening/closing device 12 may be an electrically driven device. In this case, the opening/closing device 12 can operate on the power stored in the battery cells 2. The operation of the opening/closing device 12 is controlled by the control unit 10. The control unit 10 controls the operation of a servo motor or the like for driving a door part of the opening/closing device 12 based on the temperature measured by the temperature sensor 11 to adjust the angular position of the door part. For example, when the temperature measured by the temperature sensor 11 exceeds a prescribed temperature, the control unit 10 controls the opening/closing device 12 to the open state, and when the temperature measured by the temperature sensor 11 is lower than the prescribed temperature, the control unit 10 controls the opening/closing device 12 to the closed sate.

While the opening/closing device 12 is controlled to the open state, part of the circulating air is discharged to the outside of the pack case 3 from the drain passage 91 by an amount equivalent to the amount of the external air that has entered the circulation passage 5 through the air introduction passage 630. Accordingly, in this state, the drain passage 91 serves as an air discharge passage for discharging the circulating air.

The air introduction passage 630 may be disposed so as to communicate with the cabin of the vehicle. In this case, the air supply duct 63 extends such that its air suction part is located within the cabin. The air supply duct 63 may be disposed so as to penetrate through the interior material of the cabin to lead to the cabin, or to be laid along a side of the cabin. Accordingly, the air which the fan unit 4 sucks through the air supply duct 63 is the air inside the cabin. When an air-conditioning unit for air-conditioning the cabin is provided in the vehicle, the air-conditioning unit takes in the air from outside the vehicle or inside the cabin, and supplies the temperature-controlled air to the cabin. Accordingly, in this case, the air introduction passage 630 enables introducing the external air or the air inside the cabin whose temperature is lower than the ambient temperature of the pack case 3 into the pack case 3.

In this battery pack 201, the external air is introduced into the pack case 3 only when the air introduction passage 630 is set in the open state by the opening/closing device 12. Accordingly, when the air introduction passage 630 is open, air supply and air discharge are performed concurrently while ensuring generation of a circulating air stream, and when the air introduction passage 630 is closed, since both the air supply passage and the air discharge passage are not open, only a circulating air stream is present in the pack case 3. According to the third embodiment, it is possible to suppress the operation noise of the fan unit 4 from leaking to the outside, suppress moisture and dust from entering the pack case 3, and increase the battery cooling performance by letting the external air into the pack case 3.

In addition, by increasing the battery cooling performance by letting the external air into the pack case 3, the power necessary for driving the pump 81 can be reduced to save energy.

The battery pack 201 is configured to cause the opening/closing device 12 to open the air introduction passage 630 only when a condition to introduce external air is satisfied. Accordingly, the battery pack 201 can cool the battery cells 2 by the air circulation within the circulation passage 5, while letting fresh air into the pack case 3 to maintain the air circulation. Therefore, compared to conventional battery packs in which battery cells are cooled by always introducing and discharging a large amount of air, the battery pack 201 can suppress noise leakage greatly while ensuring generation of a circulating air stream sufficient to absorb the heat from the battery cells 2.

Further, if the temperature of the battery cells 2 is too low, it is possible to keep warm the inside of the pack case 3 by inhibiting air circulation by keeping the opening/closing device out of operation to thereby suppress heat dissipation to the outside. This makes it possible to rapidly increase the temperature of the battery cells 2 so that the battery cells 2 can supply power earlier.

It is preferable that the air introduction passage 630 is disposed so as to communicate with the cabin of the vehicle so that the air inside the cabin is sucked into the pack case 3 through the air introduction passage 630. Since the air inside the cabin being air-conditioned can be introduced into the pack case 3 through the air introduction passage 630, it is possible to increase the temperature difference between the air inside the pack case 3 and the air discharged from the drain passage 91. Accordingly, since the amount of heat dissipated to the outside can be increased, the cooling performance of the battery pack 201 can be further increased.

Other Embodiments

It is a matter of course that various modifications can be made to the above embodiments as described below.

The above embodiments may be configured such that part of refrigerant used in the air-conditioning unit of the vehicle is used for the cooling circuit 8 or 108. In this case, a switching operation is made for changing flow of the refrigerant so that part of the refrigerant flows to the cooling circuit 8 or 108.

The temperature sensor 11 may be provided in the battery passage 52. The temperature sensor 11 may be disposed so as to be in contact with the battery cell 2 for directly measuring the temperature of the battery cell 2.

The opening/closing device 12 in the third embodiment may be a mechanically-driven device for switching the air introduction passage 630 between the open and closed states. In this case, the opening/closing device 12 is provided with a temperature-sensing part and configured to drive its mechanical structure to switch the air introduction passage 630 between the open and closed states in accordance with the temperature measured by the temperature-sensing part without using electric power. For example, when the temperature measured by the temperature-sensing part exceeds a prescribed temperature, the introduction passage 630 is switched to the open state by the mechanical operation of the opening/closing device 12, and when the temperature measured by the temperature-sensing part falls below the prescribed temperature, the introduction passage 630 is switched to the closed state by the mechanical operation of the opening/closing device 12.

In the above embodiments, the collection passage 53 is formed of the collection duct 61. However, the collection passage 53 may be formed of the bottom wall 31 and the side walls.

In the above embodiments, the air circulation flow whose main stream is along the circulation passage 5 is generated by the single fan unit 4. However, the air circulation flow may be generated by two or more fan units.

In the above embodiments, the fan 41 of the fan unit 4 is a sirocco fan. However, the fan 41 may be an axial fan or a turbofan.

The above explained preferred embodiments are exemplary of the invention of the present application which is described solely by the claims appended below. It should be understood that modifications of the preferred embodiments may be made as would occur to one of skill in the art.

What is claimed is:

1. A battery pack comprising:
   battery cells;
   a fan unit that blows air for cooling the battery cells;
   a case housing therein the battery cells and the fan unit;
   a circulation passage formed in the case, in which the air blown out from the fan unit flows before being sucked into the fan unit and after exchanging heat with the battery cells, the circulation passage including a top wall side passage, battery passages and a collection passage, wherein the top wall side passage and the collection passage are on opposite sides of the battery cells such that the collection passage forms a bottom wall side passage;
   a heat exchanging part that is disposed downstream of battery passages through which the air circulating in the circulation passage as a circulating air flows to exchange heat with the battery cells and below bottom ends of the battery cells;
   a drain passage provided to be located below the heat exchanging part,
   the drain passage including a drain opening formed in a bottom wall of the case so as to be located below the heat exchanging part,
   the drain passage extending towards downside from the drain opening, and located outside the case,
   the drain passage being branched from the circulation passage and leading to outside of the case to allow condensed water of the heat exchanging part to drop by gravity through the drain passage, thereby discharging the condensed water from the drain opening;
   an air introduction passage that allows communication between the circulation passage and outside of the case, the air introduction passage being extended outside the circulation passage; and
   an opening/closing device for opening or closing the air introduction passage to permit or inhibit air introduction into the case through the air introduction passage, the opening/closing device being disposed in the air introduction passage,
   wherein the heat exchanging part is disposed within the collection passage and below the battery cells, and the drain opening located below the heat exchanging part is disposed below the battery cells and the collection passage and a circulation air flow that flows through the circulation passage is formed when the opening/closing device permits the air introduction, and
   a control unit is configured to control the opening/closing device to introduce external air while ensuring generation of the circulating air.

2. The battery pack according to claim 1, wherein the drain opening is disposed immediately below the heat exchanging part.

3. The battery pack according to claim 1, wherein each of the battery cells includes electrode terminals projecting upward from a top surface of an outer case thereof, the top surface being opposite to the bottom end which is on a side of the heat exchanging part.

4. The battery pack according to claim 1, wherein
   the drain passage is smaller in cross-sectional area than the collection passage.

5. The battery pack according to claim 1, wherein
   the air introduction passage is smaller in cross-sectional area than the collection passage.

6. The battery pack according to claim 1, wherein
   the air introduction passage includes an opening formed in the bottom wall of the case.

7. The battery pack according to claim 1, wherein
   the air introduction passage is configured to be in fluid communication with an interior side of a cabin of a vehicle.

8. The battery pack according to claim 1, wherein
   while the opening/closing device is controlled to the open state, part of the circulating air is discharged to outside of the case from the drain passage by an amount equivalent to the amount of an external air that has entered the circulation passage through the air introduction passage.

9. The battery pack according to claim 1, wherein
   the control unit is configured to control the opening/closing device based on a temperature of the air circulating in the circulation passage.

10. The battery pack according to claim 1, wherein
    the air introduction passage extends into a vehicle cabin.

11. A battery pack comprising:
    battery cells;
    a fan unit that blows air for cooling the battery cells;
    a case housing therein the battery cells and the fan unit;
    a circulation passage formed in the case, in which the air blown out from the fan unit flows before being sucked into the fan unit and after exchanging heat with the battery cells, the circulation passage including a top wall side passage, battery passages and a collection passage, wherein the top wall side passage and the collection passage are on opposite sides of the battery cells such that the collection passage forms a bottom wall side passage;
    a heat exchanging part that is disposed downstream of battery passages through which the air circulating in the circulation passage as a circulating air flows to exchange heat with the battery cells and below bottom ends of the battery cells; and
    a drain passage provided to be located below the heat exchanging part,
    the drain passage including a drain opening formed in a bottom wall of the case so as to be located below the heat exchanging part,
    the drain passage extending towards downside from the drain opening, and located outside the case,
    the drain passage being branched from the circulation passage and leading to outside of the case to allow condensed water of the heat exchanging part to drop by gravity through the drain passage, thereby discharging the condensed water from the drain opening,
    wherein the heat exchanging part is disposed within the collection passage and below the battery cells, and the drain opening located below the heat exchanging part is positioned directly underneath the battery cells and the collection passage such that a cross-sectional area of the drain opening overlaps with a cross sectional area of a bottom side of the battery cells;

the battery pack further comprises an air introduction passage that allows communication between the circulation passage and outside of the case, and an opening/closing device for opening or closing the air introduction passage to permit or inhibit air introduction into the case through the air introduction passage; and a circulation air flow that flows through the circulation passage is formed when the opening/closing device permits the air introduction.

12. The battery pack according to claim 11, wherein each of the battery cells includes electrode terminals projecting upward from a top surface of an outer case thereof, the top surface being opposite to the bottom end which is on a side of the heat exchanging part.

13. The battery pack according to claim 11, wherein the drain passage is smaller in cross-sectional area than the collection passage.

14. The battery pack according to claim 11, wherein the air introduction passage is smaller in cross-sectional area than the collection passage.

15. The battery pack according to claim 11, wherein the air introduction passage includes an opening formed in the bottom wall of the case.

16. The battery pack according to claim 11, wherein the air introduction passage is configured to be in fluid communication with an interior cabin of a vehicle.

* * * * *